(12) United States Patent
Williamson

(10) Patent No.: US 10,167,098 B2
(45) Date of Patent: Jan. 1, 2019

(54) BOX FILLER FOR PRODUCE PACKAGING

(71) Applicant: Robert L. Williamson, Hartford, MI (US)

(72) Inventor: Robert L. Williamson, Hartford, MI (US)

(*) Notice: Subject to any disclaimer, the term of this patent is extended or adjusted under 35 U.S.C. 154(b) by 621 days.

(21) Appl. No.: 14/295,484

(22) Filed: Jun. 4, 2014

(65) Prior Publication Data
US 2015/0353212 A1 Dec. 10, 2015

(51) Int. Cl.
| | |
|---|---|
| B65B 25/04 | (2006.01) |
| B65B 43/52 | (2006.01) |
| B65B 43/56 | (2006.01) |
| B65B 57/04 | (2006.01) |
| B65B 59/00 | (2006.01) |
| B65B 1/34 | (2006.01) |
| G01G 11/00 | (2006.01) |
| G01G 23/16 | (2006.01) |

(52) U.S. Cl.
CPC ............ *B65B 25/04* (2013.01); *B65B 1/34* (2013.01); *B65B 43/52* (2013.01); *B65B 43/56* (2013.01); *B65B 57/04* (2013.01); *B65B 59/005* (2013.01); *G01G 11/00* (2013.01); *G01G 23/16* (2013.01)

(58) Field of Classification Search
CPC ......... B65B 25/04; B65B 25/046; B65B 1/30; B65B 1/32; B65B 1/34; B65B 43/56; B65B 43/48; B65B 59/005
USPC .......................................................... 53/502
See application file for complete search history.

(56) References Cited

U.S. PATENT DOCUMENTS

| | | | | |
|---|---|---|---|---|
| 3,416,619 A | * | 12/1968 | McClusky | B65B 1/34 177/123 |
| 3,738,077 A | * | 6/1973 | Leach | G01G 13/026 177/120 |
| 3,990,212 A | * | 11/1976 | Flodin | B65B 1/32 141/83 |
| 4,010,595 A | * | 3/1977 | Boyd | B65B 57/04 141/157 |
| 4,600,065 A | * | 7/1986 | Morris | G01G 13/241 141/128 |
| 4,965,982 A | * | 10/1990 | Jesperson | B65B 39/007 198/839 |

(Continued)

*Primary Examiner* — Andrew M Tecco
*Assistant Examiner* — Chelsea Stinson
(74) *Attorney, Agent, or Firm* — R. Tracy Crump

(57) ABSTRACT

A "weigh/fill" type box filler for cherries, cherries and similar small produce that incrementally moves and fills an array of individual packaging bags within conventional packing boxes. The box filler includes a box conveyer, a producer conveyer, a metering gate, a weigh/fill scale assembly and three independent box lifters. The box conveyer moves the packing boxes incrementally over the weigh/fill scale assembly to position each row of bags within successive packing boxes beneath the metering gate. As one packing box is incrementally moved across the weigh/fill scale assembly and each row of bags is weigh/filled, the box lifters sequentially raise the adjacent preceding and following packing boxes out of contact with the weigh/fill scale assembly. The metering gate uses independently actuated gate paddles to selectively control the flow of produce into the individual bags first at a high volume "gross" fill rate and finishing with a lower volume or "fine" fill rate.

9 Claims, 16 Drawing Sheets

(56) References Cited

U.S. PATENT DOCUMENTS

| | | | | |
|---|---|---|---|---|
| 5,024,047 A * | 6/1991 | Leverett | ............... | B65B 1/34 |
| | | | | 209/912 |
| 5,121,589 A * | 6/1992 | Ventura | ............... | B65B 25/04 |
| | | | | 53/240 |
| 5,325,653 A * | 7/1994 | Boyd | ............... | B65B 25/046 |
| | | | | 141/128 |
| 5,365,722 A * | 11/1994 | Edwards | ............... | B65B 3/28 |
| | | | | 53/237 |
| 5,738,893 A * | 4/1998 | Kornet | ............... | B65B 25/04 |
| | | | | 206/554 |
| 6,058,681 A * | 5/2000 | Recchia, Jr. | ............... | B65B 9/093 |
| | | | | 53/373.5 |
| 6,955,031 B2 * | 10/2005 | Doake | ............... | G01G 15/00 |
| | | | | 53/244 |
| 2005/0034430 A1 * | 2/2005 | Holzlwimmer | ............... | B65B 1/32 |
| | | | | 53/469 |
| 2011/0126940 A1 * | 6/2011 | Herrmann | ............... | B67C 3/202 |
| | | | | 141/83 |
| 2011/0240530 A1 * | 10/2011 | Miedema | ............... | B65B 1/32 |
| | | | | 209/337 |

* cited by examiner

BOX FILLER FOR PRODUCE PACKAGING

This invention relates to produce packaging equipment, and in particular, an apparatus for incrementally filling an array of individual packaging bags of a packing box with cherries, blueberries or similar small produce.

BACKGROUND OF THE INVENTION

Cherries, blueberries and similar small round fruit and produce are frequently packaged in individual plastic bags ("baggies") and small plastic "clam shell" type containers for consumer convenience. Automated packaging systems for cherries, blueberries and similar produce employ a variety of conveyers, hoppers, sizers, dryers, weigh/fill machines and other apparatus that transport, process, and meter the cherries into individual bags and containers. The goal of such automated packaging systems is to fill the bags or containers as quickly as possible, while consistently and precisely filling each bag or container with the desired amount of produce.

In order to maximize the packaging process, weigh/fill packaging machines have been developed that fill an array of multiple individual bags carried in specialized packing boxes. These specialized packing boxes are commonly known in the industry and generally include a large box base and a pair of nested dividers seated atop the box base. The dividers segment and arrange the individual bags into multiple rows within the container box. The dividers help funnel the produce into the bags and hold the mouth of each bag open for receiving the berries. Once filled, the dividers are removed and the bags sealed while still disposed within the box base, which is used as a shipping container for the bags of individually packaged berries.

SUMMARY OF THE INVENTION

The apparatus of this invention provides a "weigh/fill" type box filler for cherries and similar produce that incrementally moves and fills an array of individual packaging bags within conventional packing boxes. The box filler of this invention includes a box conveyer, a producer conveyer, a metering gate, a weigh/fill scale assembly and three independent box lifters, all supported by a general frame structure. The box conveyer incrementally transports packing boxes across the length of the box filler. The produce conveyer is suspended longitudinally over the box conveyer and the metering gate control the flow of produce from the produce conveyer into the packing boxes. The box conveyer moves the packing boxes incrementally over the weigh/fill scale assembly to position each row of bags within successive packing boxes beneath the metering gate. As one packing box is incrementally moved across the weigh/fill scale assembly and each row of bags is weigh/filled, the box lifters sequentially raise the adjacent preceding and following packing boxes out of contact with the weigh/fill scale assembly. The independent box lifters ensure an accurate weigh/fill and eliminates the need to space the packing boxes apart along the box conveyer, thereby improving the overall operation of the box filler. The box filler of this invention also provides improved weigh/fill accuracy. The metering gate uses independently actuated gate paddles to selectively control the flow of produce into the individual bags. The metering gate allows each row of bags to be weigh/filled quickly to a first predefined weight using the high volume "gross" fill rate and then precisely filled to final weight using the lower volume "fine" fill rate. Consequently, the metering gate maximizes the speed and accuracy of the weigh/fill process.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

Figure 1:
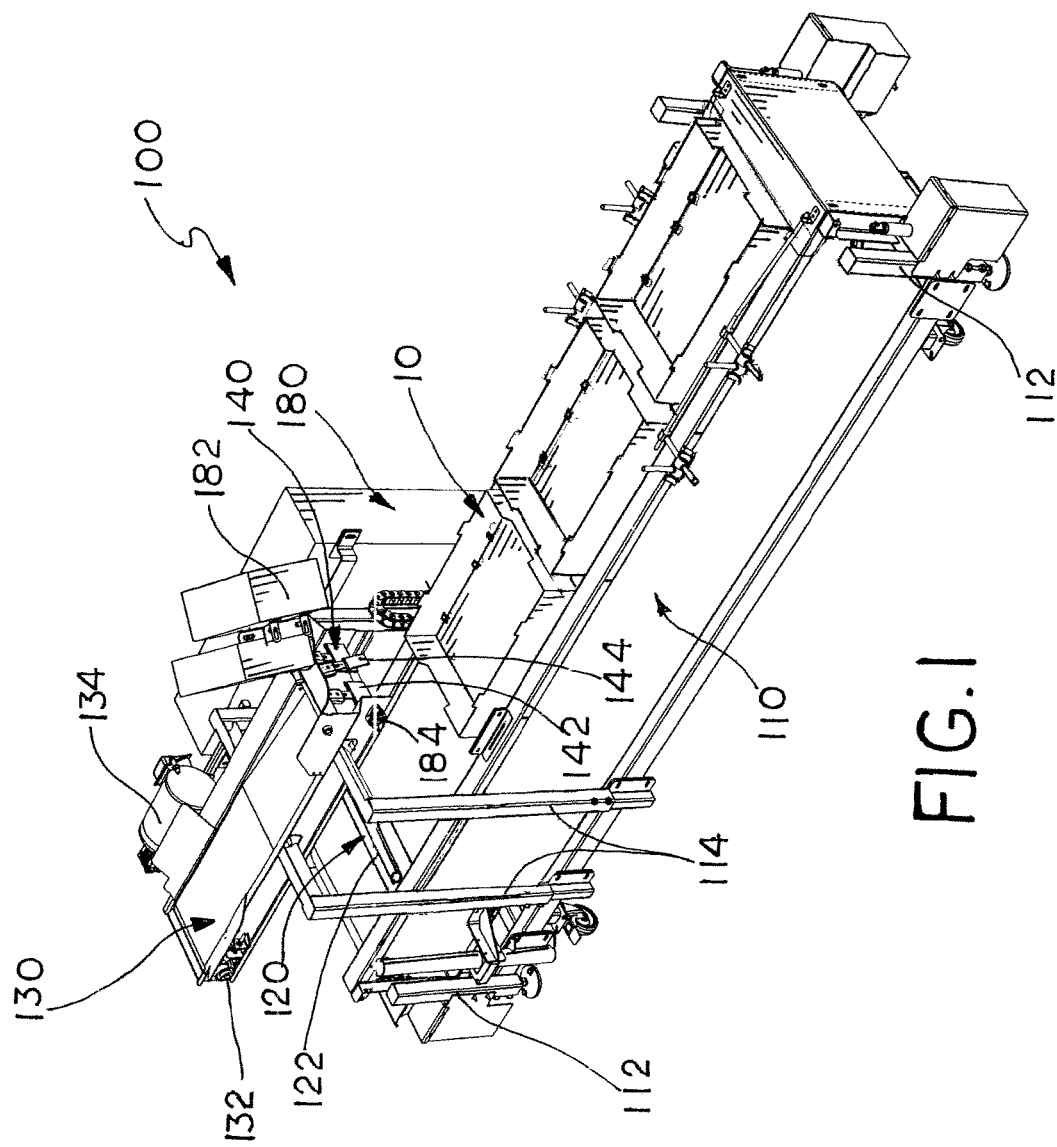
FIG. 1 is a perspective view of an embodiment of the box filler of this invention.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to the drawings, FIGS. 1-15 illustrate an exemplary embodiment of the produce fill apparatus ("box filler") of this invention, which is designated generally as reference numeral 100. Box filler 100 is intended for packaging cherries, but may be modified and adapted for packaging other types of small round produce, such as blueberries and the like. In addition, box filler 100 is intended as part of a conventional automated produce process packaging system. Automated produce process packaging systems incorporate a variety of other processing and packaging equipment and machinery, such as, container and produce conveyers, container de-nesters, produce sizers, produce hoppers, container closing mechanisms, and various process controls. This type of processing equipment, packaging machinery and controls are well known and need not be described to illustrate the teaching of this invention. Automated packaging systems are generally divided into sub systems or stations that perform a particular process or packaging function.

Box filler 100 incrementally moves and weigh/fills an array of individual packaging bags within conventional packing boxes. Box filler 100 is designed and intended to be incorporated as the fill station mechanism of an automated packaging system. Within the automated packaging systems, produce conveyers transport cherries and packing boxes to box filler 100 from other processing stations and transport the shipping containers with filled bags of produce to other packaging process stations. The figures illustrate only box filler 100, but those skill in the art can assume that a variety of conveyers are employed to transport berries, bags and containers to and from box filler 100.

Figure 2:
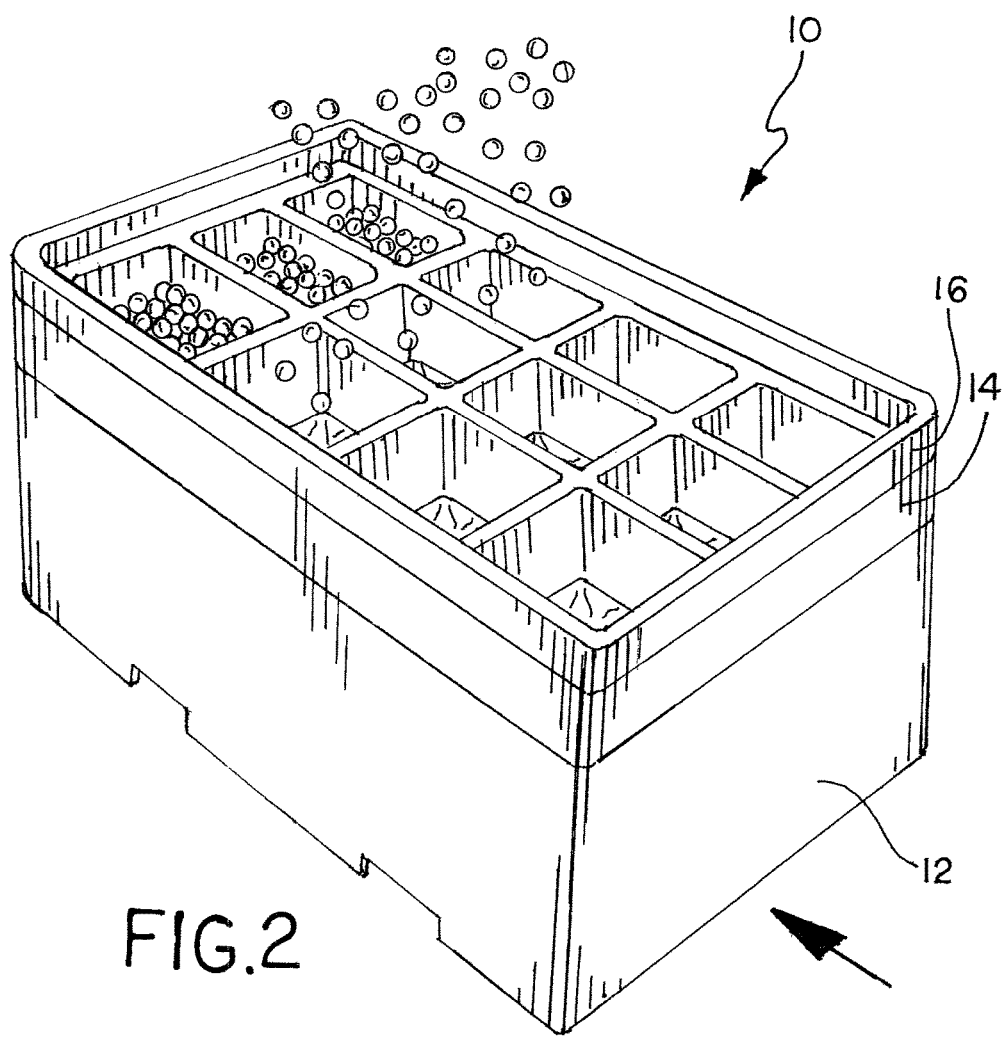
FIG. 2 is a perspective view of the packing box used with the box filler of FIG. 1.
Figure 3:
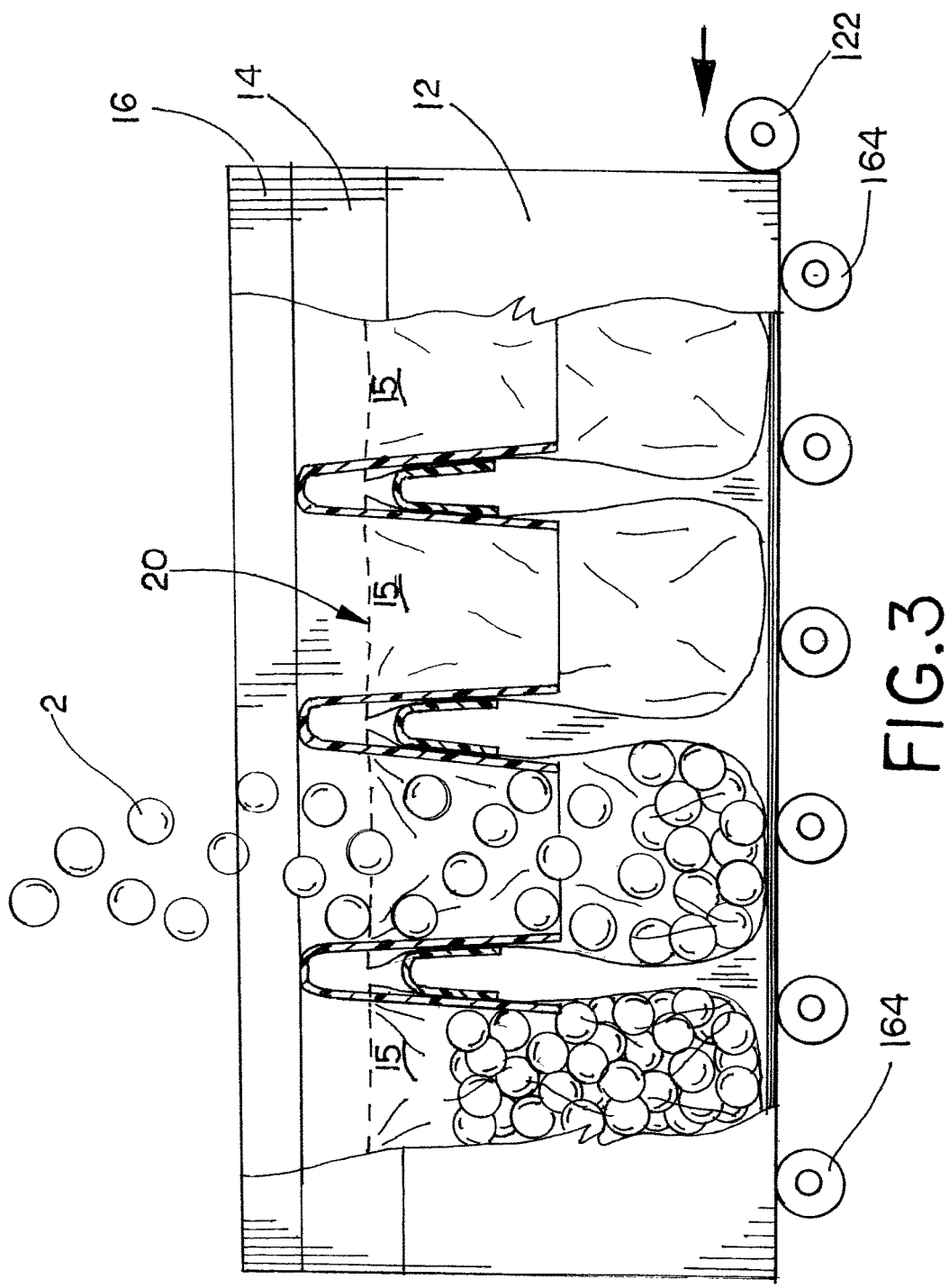
FIG. 3 is a side view of the packing box of FIG. 2 showing a portion cut away.

FIGS. 2 and 3 shows an embodiment of the specialized packing boxes 10 with the individual packaging bags 20 used by box filler 100 of this invention. These packing boxes 10 and packaging bags 20 are of conventional design and are well known in the berry process/packaging industry. Packaging bags 20 are generally transparent plastic bags of the type suitable for use as a food container. Packing boxes 10 include a box base 12 and a pair of nested dividers 14 and 16 seated atop the box base. The box base 12 is generally constructed of cardboard as a disposable unit, but may be constructed or formed from other materials including plastic. Dividers 14 and 16 are intended as reusable components in the packaging process and are generally constructed from a durable plastic material. Dividers 14 and 16 are configured to nest together and seat atop box base 12 to support and hold open the individual packaging bags in the container box during the filling process and eliminate the need to transfer the filled bags to another shipping container. Dividers 14 and 16 are configured to have an array (four rows, three across) of recessed openings through which cherries are deposited into packaging bags 20. Each packaging bag 20 is disposed within the funnel opening with the mouth of the bag held open between the nested side walls that define openings 15 in dividers 14 and 16.

Box filler 100 is built on a frame structure 110 that supports its various components and sub-assemblies. Frame structure 110 is of conventional design and construction commonly used in automated packaging equipment and employs a variety of beams, legs, supports, cross members, platforms, brackets, covers, fastners and other frame components and parts that support, carry and secure the various components and sub-assemblies of box filler 100. Box filler 100 includes of the following sub assemblies: a box conveyer 120, a produce conveyer 130, metering gate 140, dry scale 150, weigh/fill scale assembly 160 and three independent box lifters 170, 172 and 174, and electronic controller 180.

Box conveyer 120 incrementally transports packing boxes across the length of box filler 100. Box conveyer 120 is supported by frame structure 110, which includes adjustable uprights 112 that allows the height of box conveyer 120 to be selectively raised and lowered to accommodate and cooperate with other packing and processing equipment, such as other conveyers, sorters and dryers and the like. Box conveyer 120 includes a plurality of spaced traverse push bars 122 connected between parallel linked drive chains 124, which are trained around a various cogs, gears, wheels, rollers and belt tensioners. Box conveyer 120 is driven by a conventional electric motor (not shown) that turns a pair of drive gears 126 around which drive chains 124 are trained. Push bars 122 abut spaced to receive packing boxes 10 there between and push the packing box over the conveyer table along the length of box filler 100. Push bars 122 are detachably connected to drive chains 126 so that they can be selectively spaced from one another to accommodate receiving varying sizes of packing boxes. As shown, the top run of box conveyer 120 is generally horizontal and moves packing boxes 10 over a flat conveyer table formed by various rollers of weigh/fill assembly 160, the smooth flat top of dry scale 150, and smooth frame plates 116 mounted to frame structure 110.

Produce conveyer 130 is supported by its own frame structure and suspended longitudinally over the down stream end of box conveyer 120 by four adjustable stanchions 114. Stanchions 114 allow produce conveyer 130 to selectively positioned over box conveyer 120 at varying heights to accommodate packing boxes 10 of varying heights. Produce conveyer 130 is a conventional endless belt type conveyer suitable for moving small delicate produce. Produce conveyer 130 is trained around a pair of end rollers 132. One end roller 132 is driven by an electric motor 134 operatively connected to controller 180. It should be noted that produce conveyer 130 moves cherries in the opposite direction as box conveyer 120. The down stream end of produce conveyer 130 extends to a midpoint along the length of box filler 100. Cherries are deposited at the upstream end of the produce conveyer assembly 130 (the downstream end of box conveyer 120), which travel down stream to metering gate 140.

Metering gate 140 includes a pair of end gate paddles 142 and a center gate paddle 144 pivotally mounted to a cross shaft 146 mounted to the frame structure of produce conveyer 130. Separate paddle actuators 148 independently rotate each of gate paddles 142 and 144 about shaft 146 between an open position and a closed position in response to electrical signals from controller 180 to meter cherries into packing boxes 10. In the present embodiment, actuators 148 are electrical linear actuators, but in alternative embodiments, the actuators may be pneumatic pistons, or may employ other suitable actuation mechanism, such as gears driven by electrical motors and the like. As shown, paddles 142 and 144 have a lever arm rotatably mounted to shaft 146 and terminate in wide flat paddle blades, which align shoulder to shoulder to extend across of width of produce conveyer 130. In the closed position, gate blades are rotated toward the end of produce conveyer 130 and block cherries from falling from produce conveyer 130 into packing boxes 10. In the open positions, gate paddles 142 and 144 rotate away from produce conveyer 130 allowing cherries to fall into packing boxes carried along box filler 100 by box conveyer 120 under the down stream end of produce conveyer 130. In other embodiments of the metering gates, the flat blades of the paddle design may be replaced by scoops, buckets and other types of gate structures within the teachings of this invention. A variety of gate structures have been employed in process packaging applications and the particular design of the gate structure may vary with the particular application as desired.

Frame 110 supports an empty box weigh scale 150 near the upstream end of box filler 100. Empty box weigh scale 150 is used to measure the weight of each empty packing box 10 to provide a very precise weigh fill by calculating for variations in the weight of individual packing boxes 10. Weigh scale 150 is of conventional design and well known in the art. Weigh scale 150 includes a flat top 152 which forms part of the conveyer top and various load cells operatively connected to controller 200.

Figure 4:
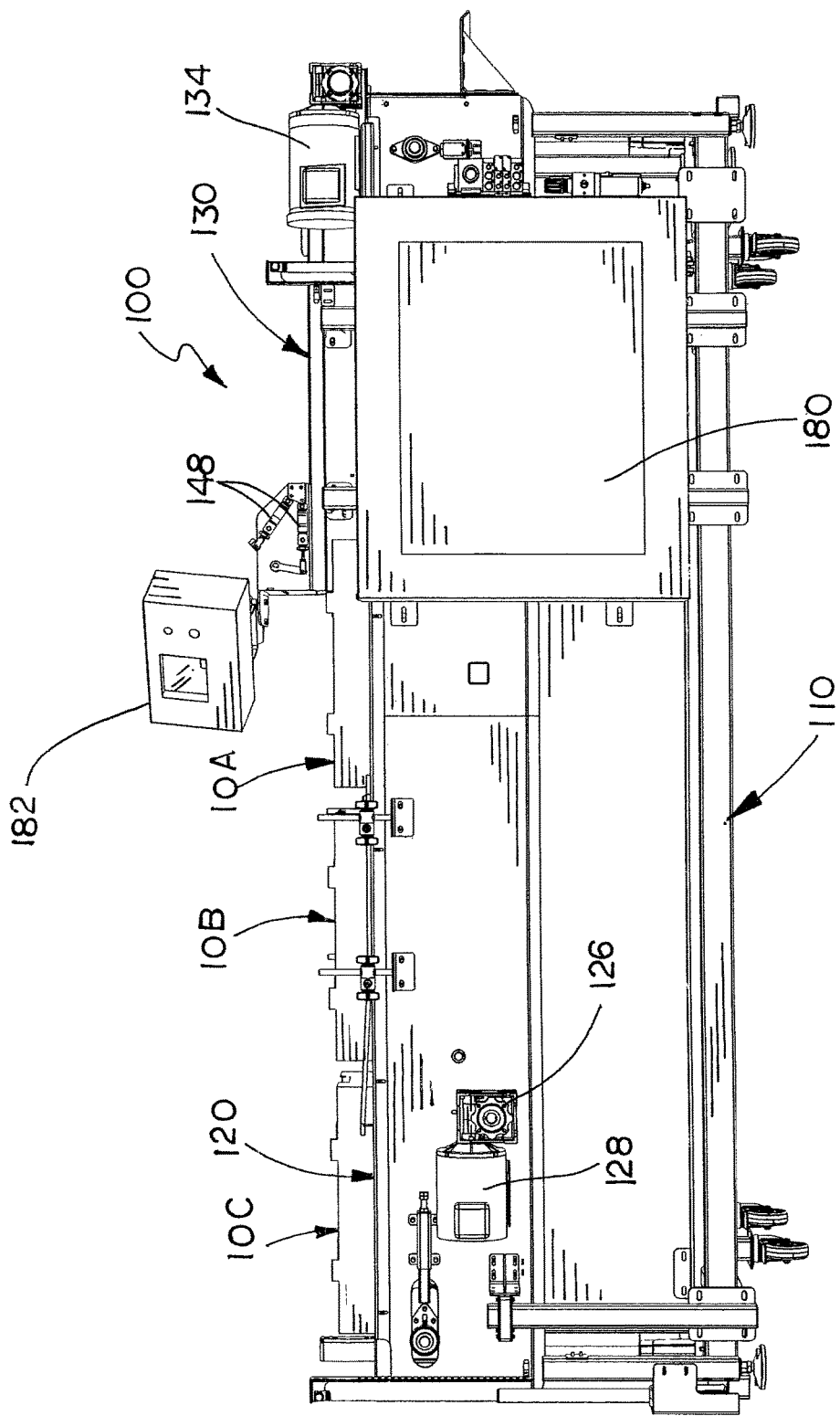
FIG. 4 is a right side view of the box filler of FIG. 1.
Figure 5:
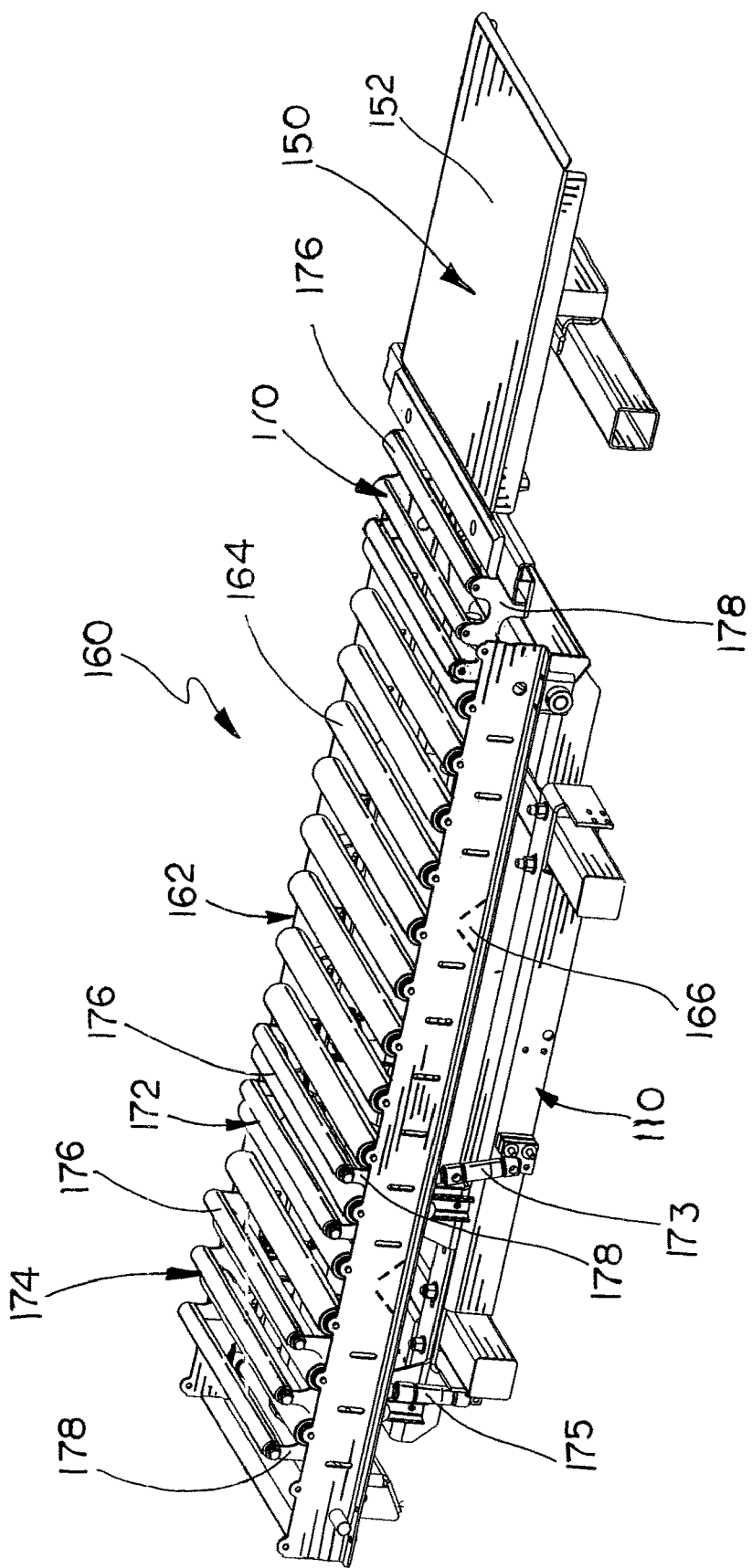
FIG. 5 is a perspective view of the empty weigh scale and weigh/fill scale assembly used in the box filler of FIG. 1.

Box conveyer 120 moves packing boxes 10 incrementally over the weigh/fill scale assembly 160 to position each row of bags within successive packing boxes beneath the metering gate 140. Weigh/fill scale assembly 160 is generally centered at a mid point of the box filler 100 under the down stream end of produce conveyer 130. As shown in FIG. 4, fill scale assembly 160 has a roller deck 162 suspended atop a second electronic weigh scale 168. Roller deck 162 includes a plurality of spaced rollers 164 rotatably mounted between a pair of side beams 166. Roller deck 162 generally forms part of the conveyer table over which box conveyer 120 moves packing boxes 10. Weigh scale 168 is of conventional design and is operatively connected to controller 200 to measure the weight of the entire roller deck 162 and any packing box 10 supported atop the roller deck. Weigh scale 168 is selected to use torsion compensated load cells to precisely measure the weight of a packing box on roller deck 162 during the fill process regardless of the location of the packing box atop the roller deck.

Box filler 100 has three independent box lifters 170, 172 and 174 which selectively raise adjacent packing boxes 10 out of contact with roller deck 162 during the fill process. Each of the three box lifters 170. 172, and 174 includes a plurality of lift rollers 176 connected between a pair of fingered frame members 178 that are pivotally connected to frame structure 110 and independently actuated by extensible actuators 171, 173, and 175 respectively. Lift actuators 171, 173, and 175 extend and retract to raise and lower the lift rollers 176 between a raised position, lifting packing boxes 10 out of contact with the roller deck 162. Lift actuators 171, 173, and 175 are typically electric linear actuators, but in certain embodiments hydraulic or pneumatic pistons, as well as other suitable mechanical devices that allow the lift roller 176 to be raised and lowered. First box lifter 170 is located in a space between empty scale 150 and weigh/fill scale assembly 160. Second and third box lifters 172 and 174 are positioned under roller deck 162. Lift rollers 176 of the second and third lift mechanisms 172 and 174 are interposed between roller 164 of roller deck 162. As shown, the second lift mechanism has two lift rollers, while the first and third lift mechanisms have three lift rollers. In certain other embodiments, the number of lift rollers may vary depending on the dimensions and configurations of the packing boxes used in the particular fill application.

Controller 180 controls the operation and various functions of box filler 100 and is wired to or otherwise operatively coupled to the various sensors, switches, scales, motors, actuators and other control components and sub-assemblies of box filler 100. Controller 180 includes a user interface 182, which allow the user to input, monitor and control the operational parameters and functions of box filler 100. Controller 180 and user interface 182 are of conventional design and of the type well known in the process packaging industry and has a user interface (not shown) that allows the operation and various functions to be monitored and controlled by an individual user. In other embodiment, the operations and control functions provided by the controller may be integrated as part of a larger process packaging control system where those operations and functions are controlled remotely or as part of an integrated process packaging control system. As is common with such electronic control devices, controller 180 include a logic CPU, memory, and data storage, which monitors, stores, calculates and processes weigh measurement signals, box positional signals and functional operations based on user defined parameters and setting.

Controller 180 uses a plurality of position sensors 184 (FIG. 1) mounted at various locations of frame structure 110 to monitor and control the physical location of packing boxes 10 as box conveyer 120 moves them along the length of box filler 100. Position sensors 184 may take the form of photoelectric eyes, laser position indicators, contact switch or other similar devices, all of which are well known in the automated process control industry. Signals from position sensors 184 trigger controller 180 to halt box conveyer 120 when a particular packing box 100 reaches at certain predetermined location so that each row of packaging bags can be incrementally weigh/filled. Controller 180 also uses signals from empty weigh scale 150 and weigh/fill scale 168 to actuate metering gate 140 in monitoring and controlling the weigh/fill process for each row of packaging bags 20. Controller 180 uses the signals from empty box scale 150 to monitors the empty weight of each packing box 10 and compensate for weight variations between individual box trays and dividers and ensure that an accurate amount of cherries or produce are metered into each packaging bag 20.

Controller 180 also uses signals from weigh/fill scale 168 to monitor and control metering gate 140 using multiple rates of flow into the packaging bags. During the initial high volume or "gross" fill, controller 180 first actuates both end gate paddles 142 and center gate paddle 144, which allows the maximum flow rate of cherries into the packaging bags 20. Once a predetermined weight of cherries is deposited into the packaging bags, a signal from weigh/fill scale 168 triggers controller 180 to close end gate paddles 162 reducing the flow rate of cherries falling into the packaging bags 20 to a "final" or "fine" fill. When the final predetermined weight of cherries is deposited into the packaging bags, a signal from scale 168 triggers controller 180 to close gate paddles 164 and advance box conveyor 120.

FIGS. 6-16 illustrate the operation of box filler 100. For simplicity of understanding, FIGS. 6-16 illustrate how cherries are deposited into the individual bags 20 within packing boxes 10. Packing boxes 10 are placed onto box conveyor 120 at the upstream end of box filler 100 either manually or using an automated apparatus (not shown) as desired. Although, box filler 100 is intended to operate with a continuous stream of successive packing boxes 10, for simplicity of explanation, the fill process is illustrated beginning with a single initial packing box 10A.

Figure 6:
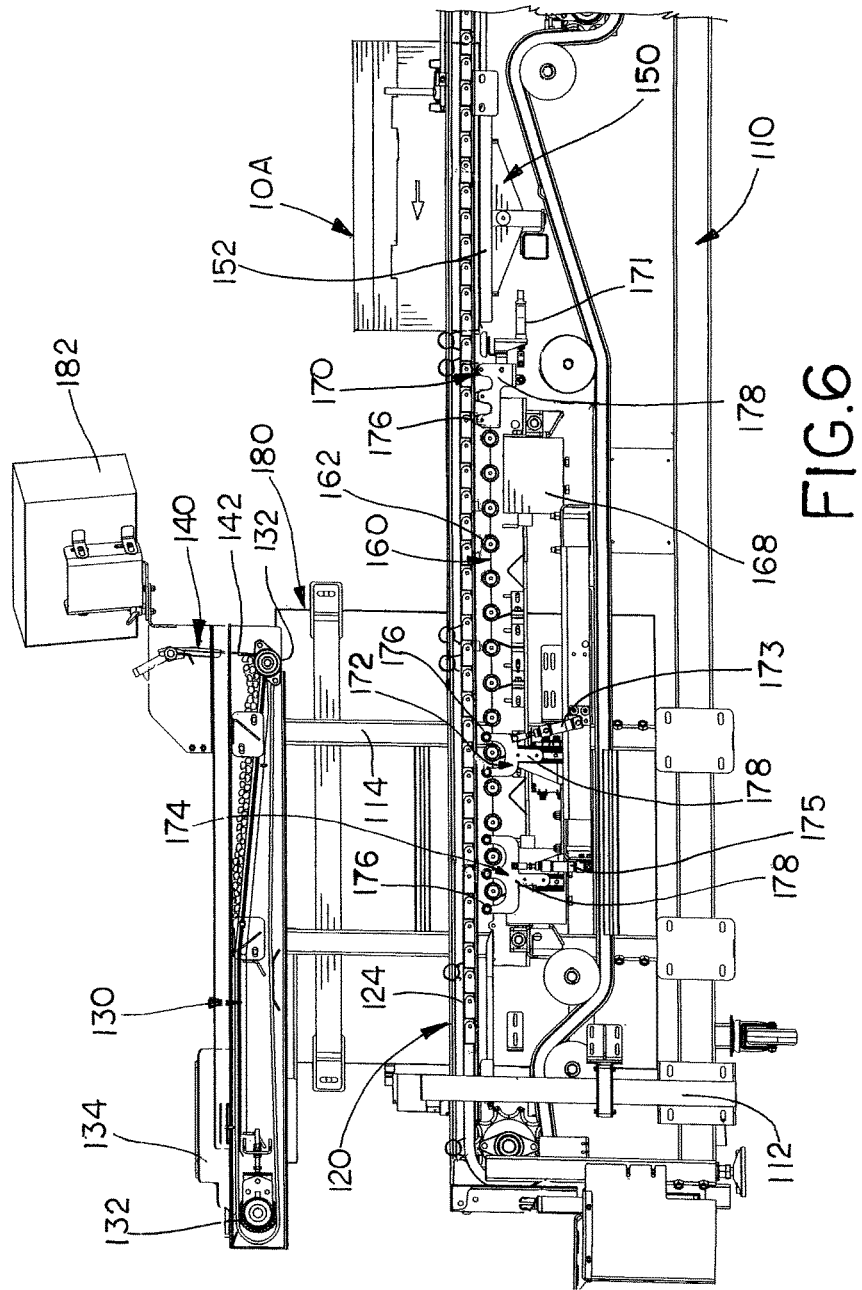
FIG. 6 is a partial side view of the box filler of FIG. 1 showing an initial packing box positioned on the empty weigh scale.
Figure 7:
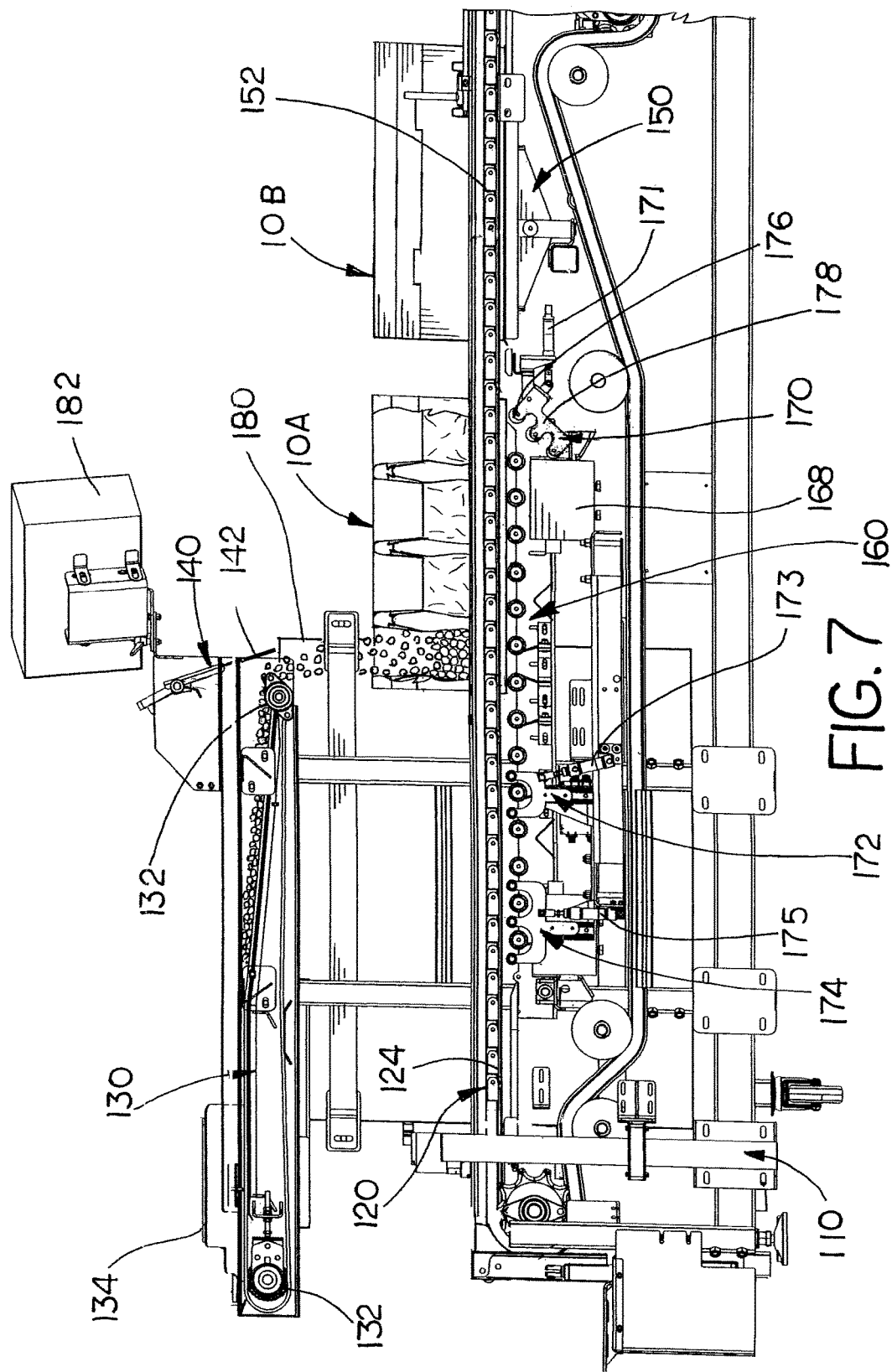
FIG. 7 is a partial side view of the box filler of FIG. 1 showing the initial packing box positioned to weigh/fill the first row of bags showing the "gross" weigh/fill of the bags and a second successive packing box positioned on the empty weigh scale.

First, box conveyor 120 moves box 10A over empty scale 150, where its empty "dry" weight is measured and stored by controller 180 (FIG. 6). Once the empty box is weighed, box conveyor 120 moves box 10A into position to fill the first row of bags 10 (FIG. 7). Position sensors 184 detect the physical position of packing box 10A along the length of the conveyor table and triggers controller 180 to stop box conveyor 120 when the first row of bags 10 within empty box 10A is directly under fill metering gate 140 and the downstream end of product conveyor 130. When box conveyor 120 stops with packing box 10A at the first weigh/fill position, the following packing box 10B is positioned over empty scale 150, where its empty "dry" weight is measured and stored by controller 180. It should be noted that box lifter 170 is in the lowered position, but box lifters 172 and 174 are in the raised position.

Figure 8:
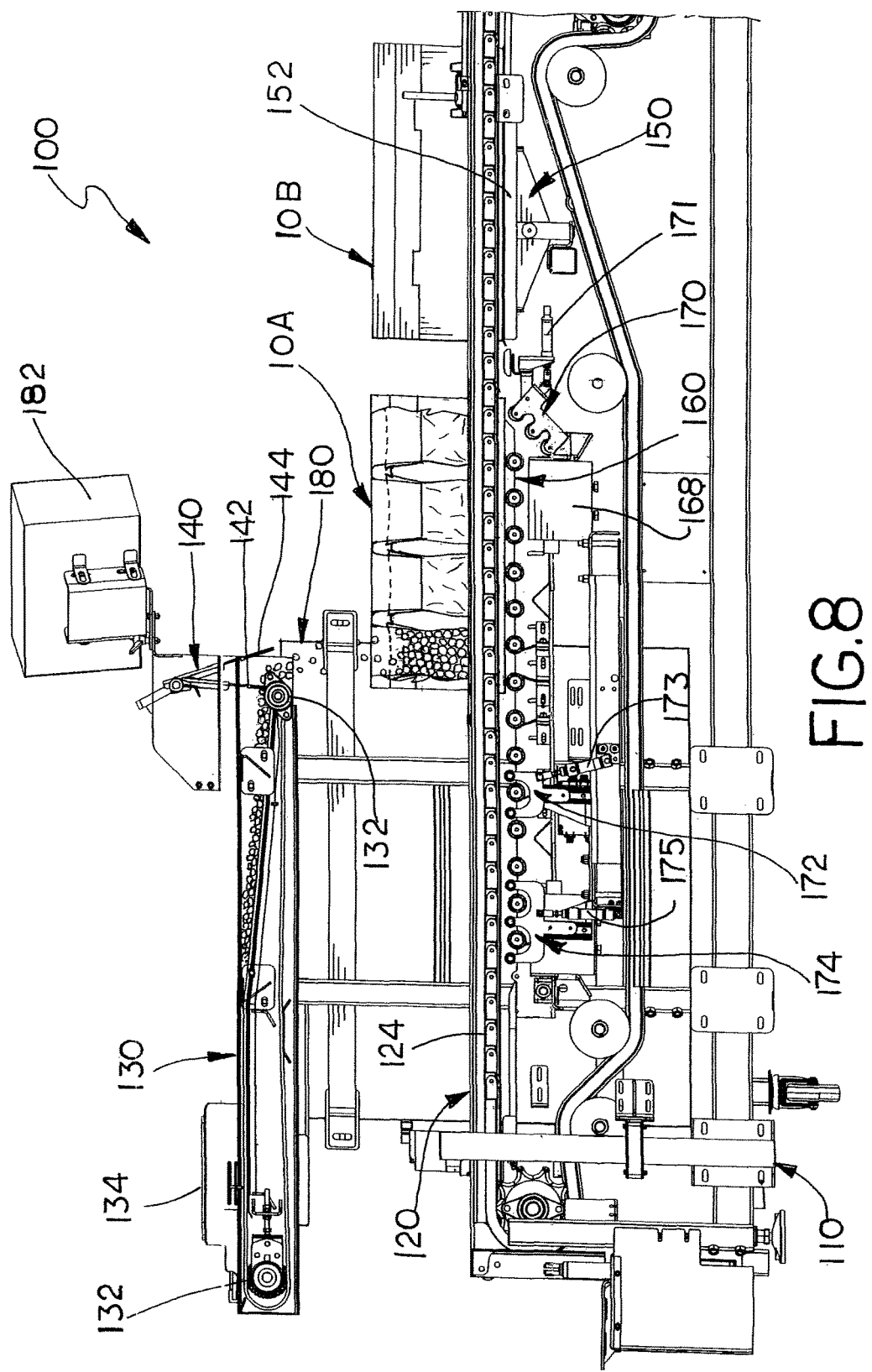
FIG. 8 is a partial side view of the box filler of FIG. 1 showing the initial packing box positioned to weigh/fill the first row of bags showing the "fine" weigh/fill of the bags.
Figure 9:
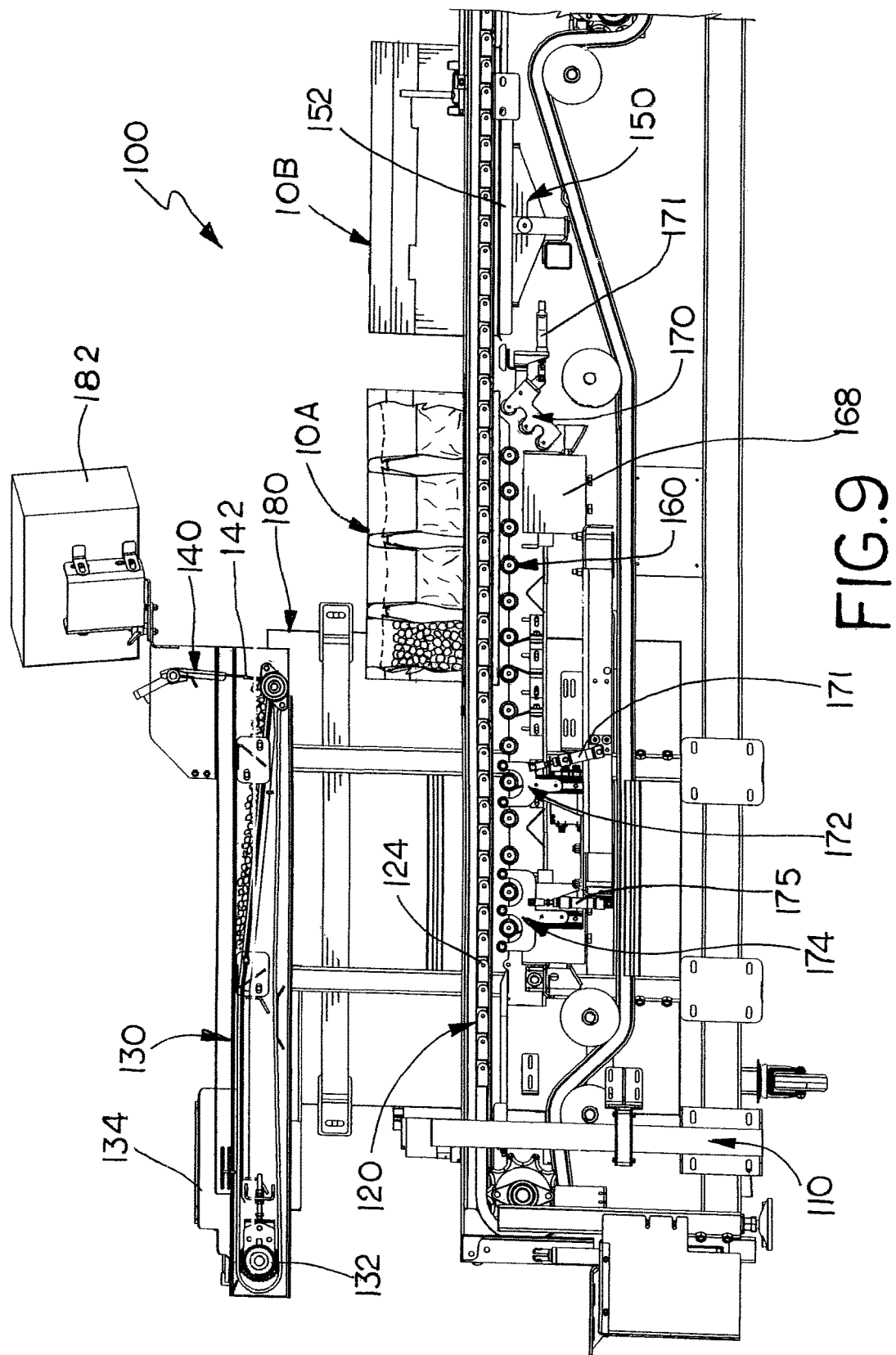
FIG. 9 is a partial side view of the box filler of FIG. 1 showing the initial packing box positioned to weigh/fill the first row of bags showing the bags filled.

Once box 10A is stopped in the "first row weigh/fill" position, controller 190 actuates metering gate 140 to begin the "gross" fill of the first row of bags 20 (FIG. 7). During the "gross" fill, controller 190 triggers all three actuators 148 to open paddles 142 and 144 allowing cherries to fall from produce conveyor 130 into the first row of bags at a maximum "gross fill" rate. As the first row of bags 10 begin to fill, controller 190 monitors the electrical signal from weigh/fill scale 168. Once box 10A reaches a predetermined "gross" fill weight of the first row, controller 190 triggers end gate paddles 142 to close, while maintaining center gate paddle 144 open thereby reducing the flow of cherries into bags 10 to the "fine" fill (FIG. 8). Once box 10A reaches a predetermined "final" fill weight, controller 190 triggers center gate paddle 144 to close, halting the flow of cherries (FIG. 9). This "gross" and "fine" fill sequence of metering gate 140 is repeated to fill each row of packaging bags 20 of packing boxes 20 as box conveyor 120 moves the packing boxes intermittently into each successive weigh/fill position.

Figure 10:
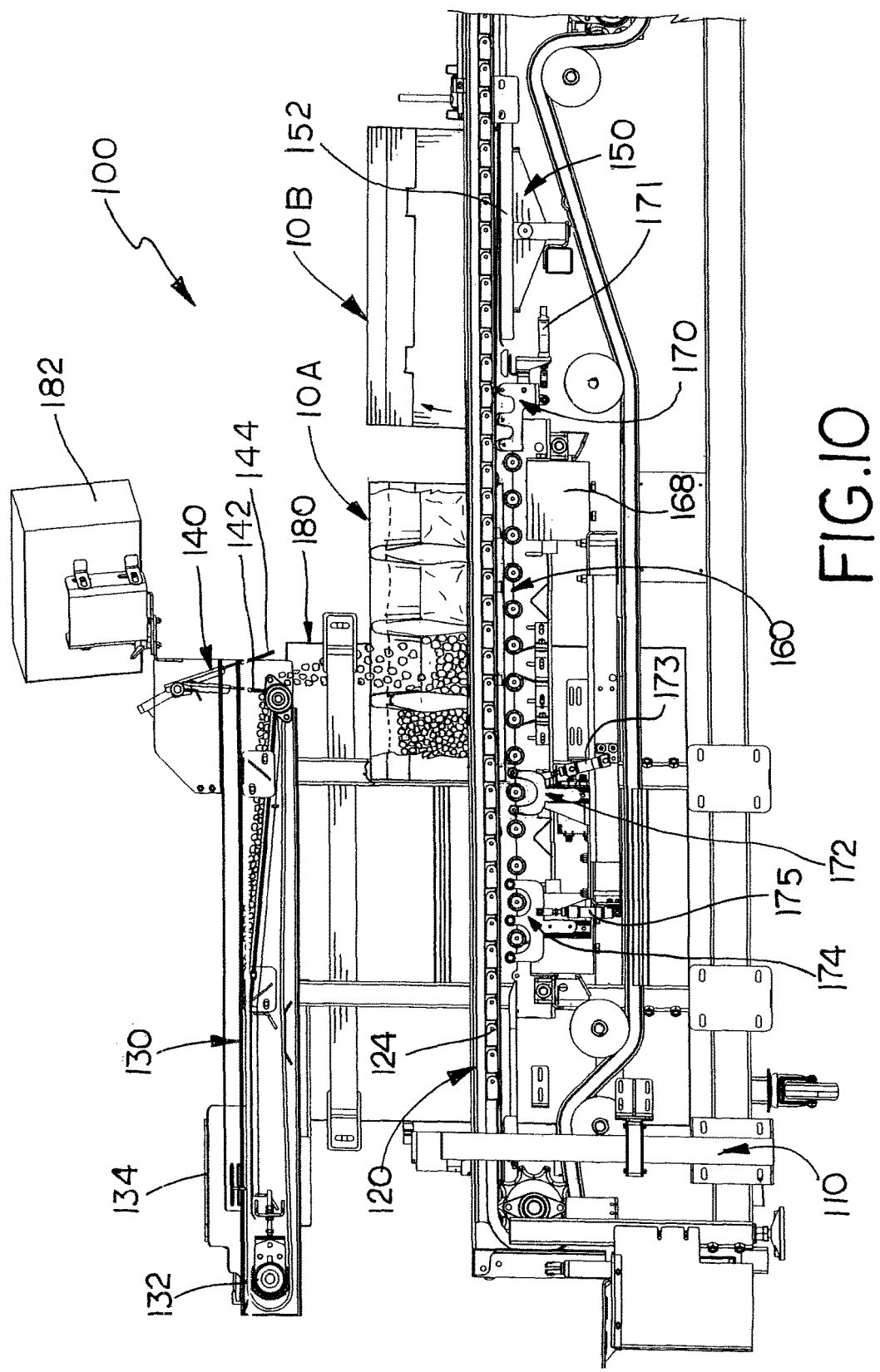
FIG. 10 is a partial side view of the box filler of FIG. 1 showing the "fine" weigh/fill of the second row of bags of the initial packing box and the first box lifter raising a second successive packing box raised off of the roller deck.
Figure 11:
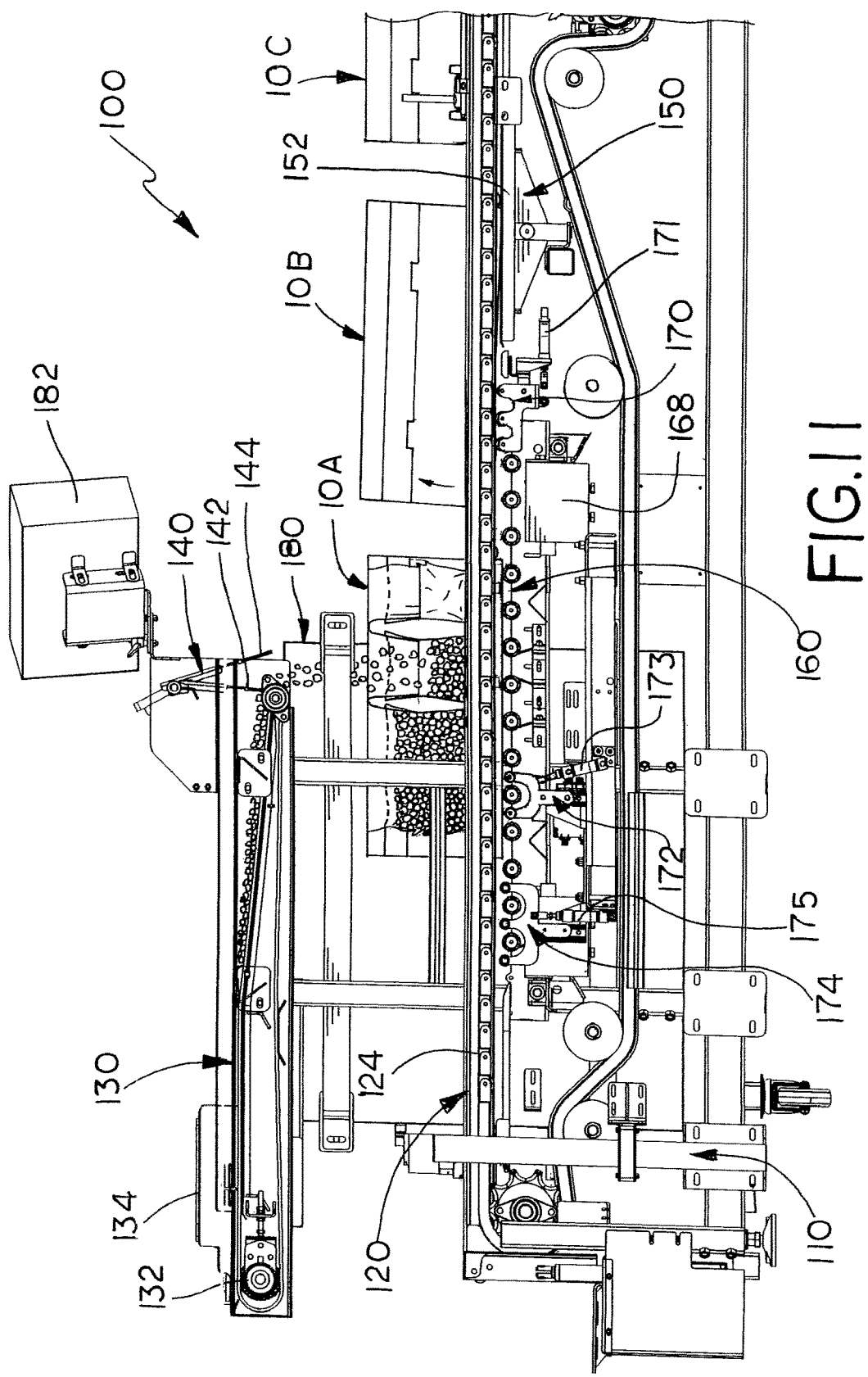
FIG. 11 is a partial side view of the box filler of FIG. 1 showing the fine weigh/fill of the third row of bags of the initial packing box and the first box lifter raising the second packing box off of the roller deck.
Figure 12:
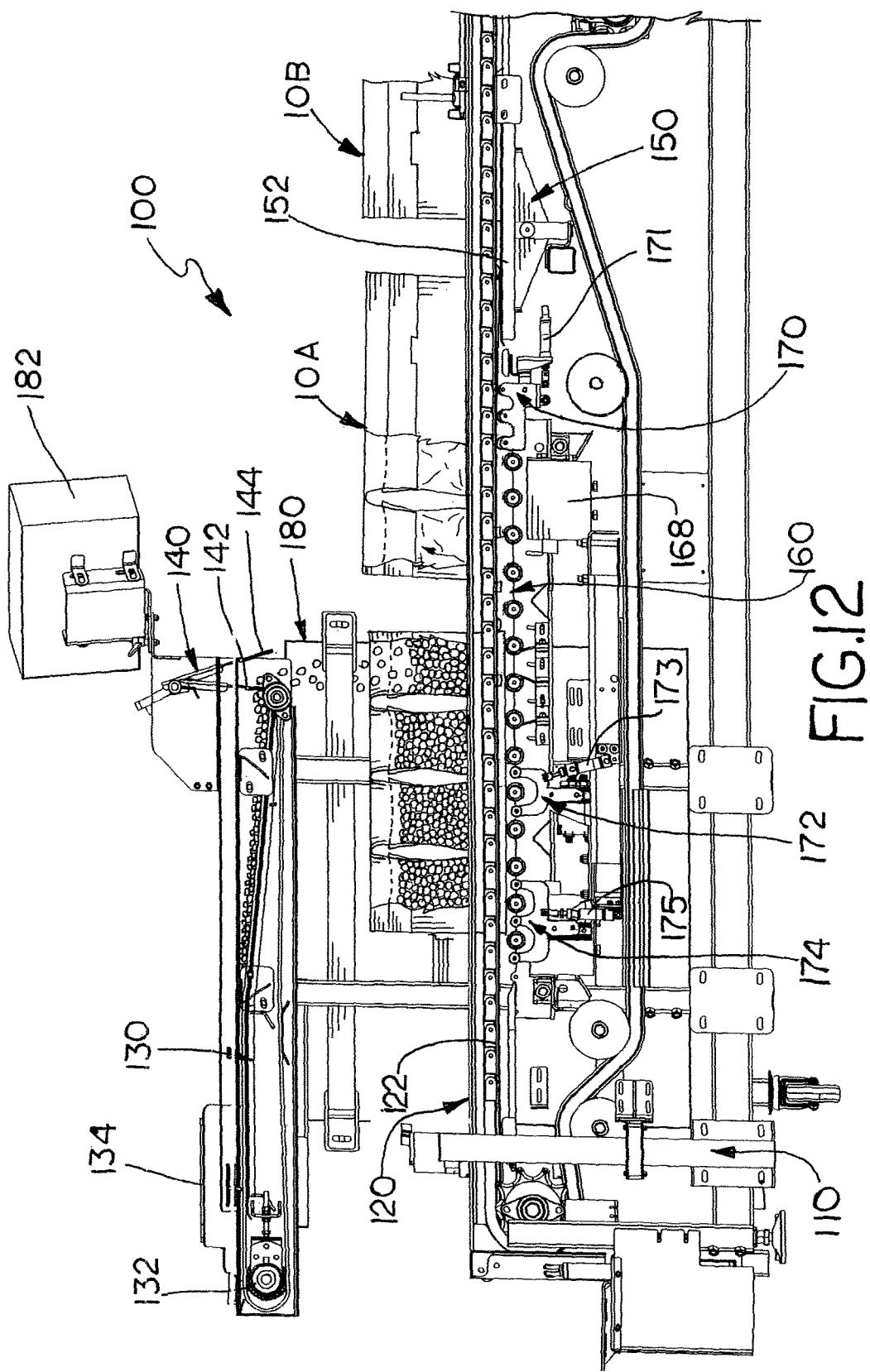
FIG. 12 is a partial side view of the box filler of FIG. 1 showing the fine weigh/fill of the fourth row of bags of the initial packing box and the first box lifter raising the second packing box off of the roller deck.

As the "fine" fill is completed and metering gate 150 closed, controller 190 triggers box conveyor 120 to advance moving packing box 10A into a second weigh/fill position where the second row of packaging bags 20 within packing box 10A is directly under metering gate 140, which also begins moving packing box 10B off of empty scale 150 (FIG. 10). As shown, controller 190 activates box lifter 170 to raise packing box 10B out of contact with roller deck 162 and deactivates box lifter 172, which descends so that its lift rollers 176 are below the rollers 164 of roller deck 162. With box lifter 172 deactivated, packing box 10A continues to rest atop roller deck 162. With box lifter 170 raising packing box 10B out of contact with roller deck 162, weigh scale 168 senses only the weight of packing box 10A. With box 10A in the second fill position, control repeats the gross and fine fill sequence to fill the second row of bags 10 in packing box 10A. Once the second row of bags 20 in packing box 10A are filled, controller 180 triggers box conveyor 120 to incrementally advance to predetermined positions to weigh/fill the third and fourth rows of bags 20 in Box 10A (FIGS. 11 and 12). As box conveyor 120 moves packing box 10A to weigh/fill the fourth row of bags 20, controller 180 deactivates box lift 174, which descends so that again its lift rollers 176 are below the rollers 164 of roller deck 162. As the third and fourth rows of bags 20 of packing box 10A are being weigh/filled, box lifter 170 remains in its raised position to keep packing box 10B out of contact with roller deck 162, thereby ensuring an accurate weigh/fill of each row of bags 20 in packing box 10A.

Figure 13:
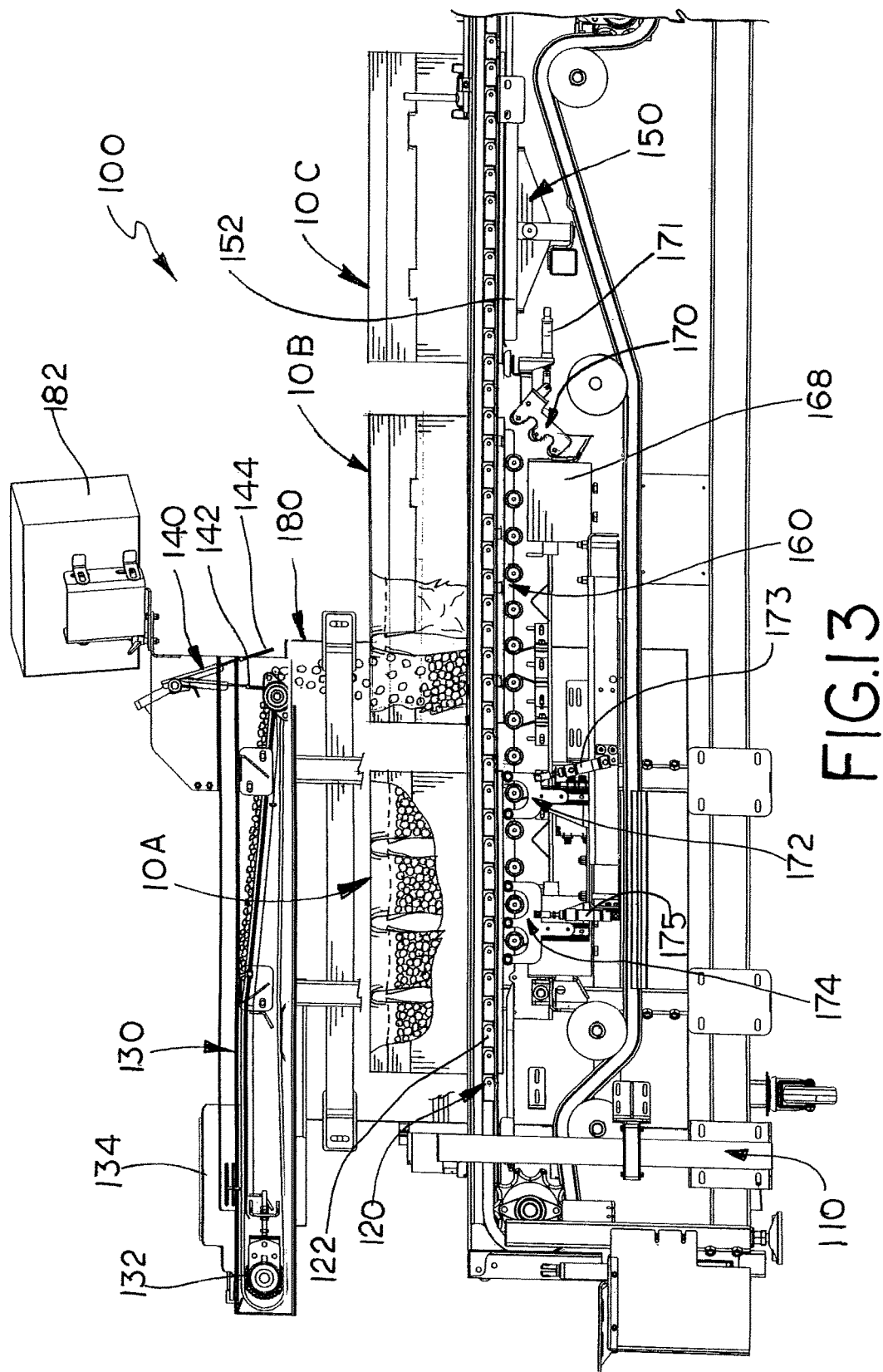
FIG. 13 is a partial side view of the box filler of FIG. 1 showing the second and third box lifters raising the initial packing box off of the roller deck, the "fine" weigh/fill of the first row of bags of the second packing box and a third successive packing box positioned on the empty weigh scale.
Figure 14:
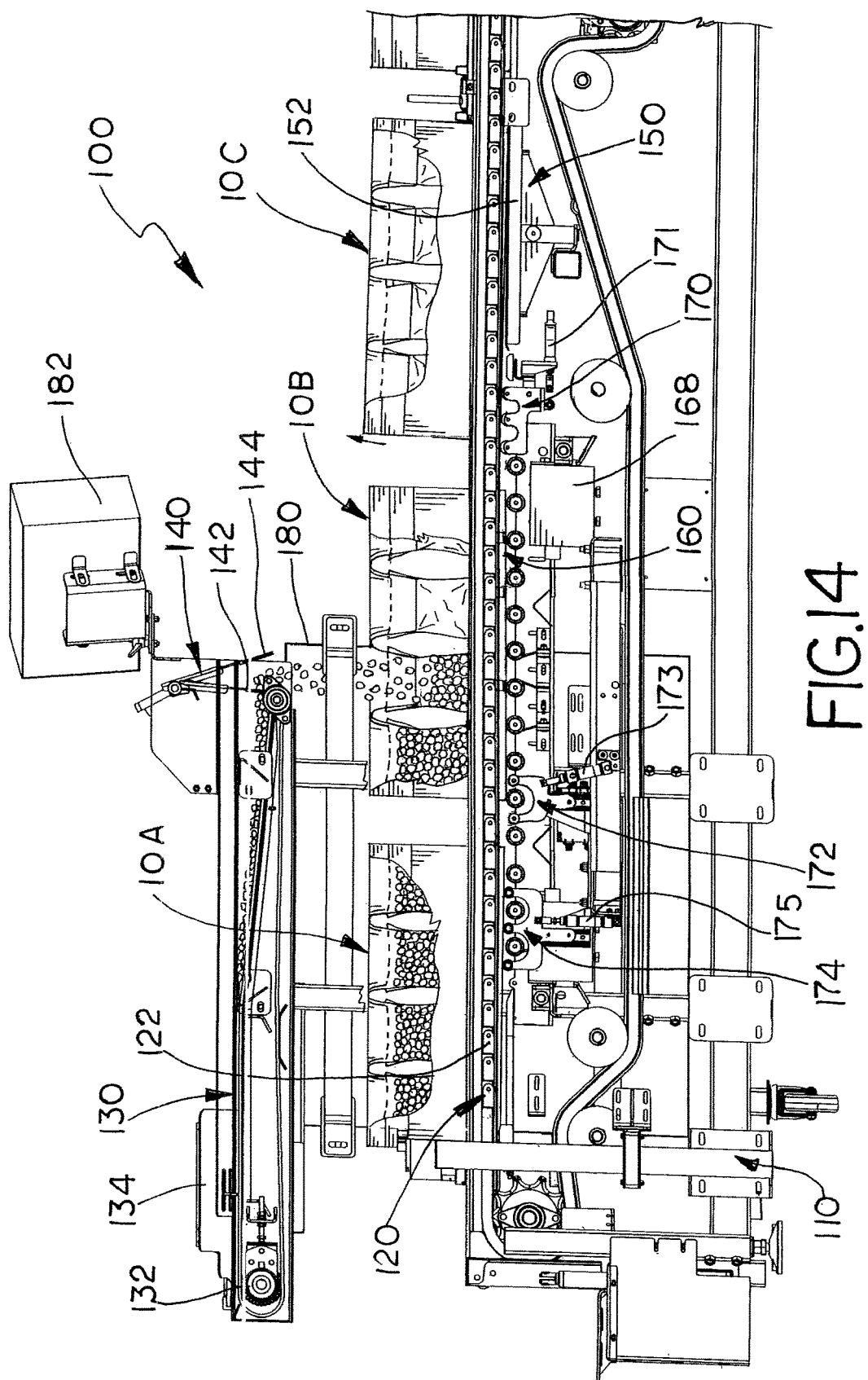
FIG. 14 is a partial side view of the box filler of FIG. 1 showing the third box lifters raising the initial packing box off of the roller deck, the "fine" weigh/fill of the second row of bags of the second packing box and the first box lifter raising the third successive packing box off the roller deck.
Figure 15:
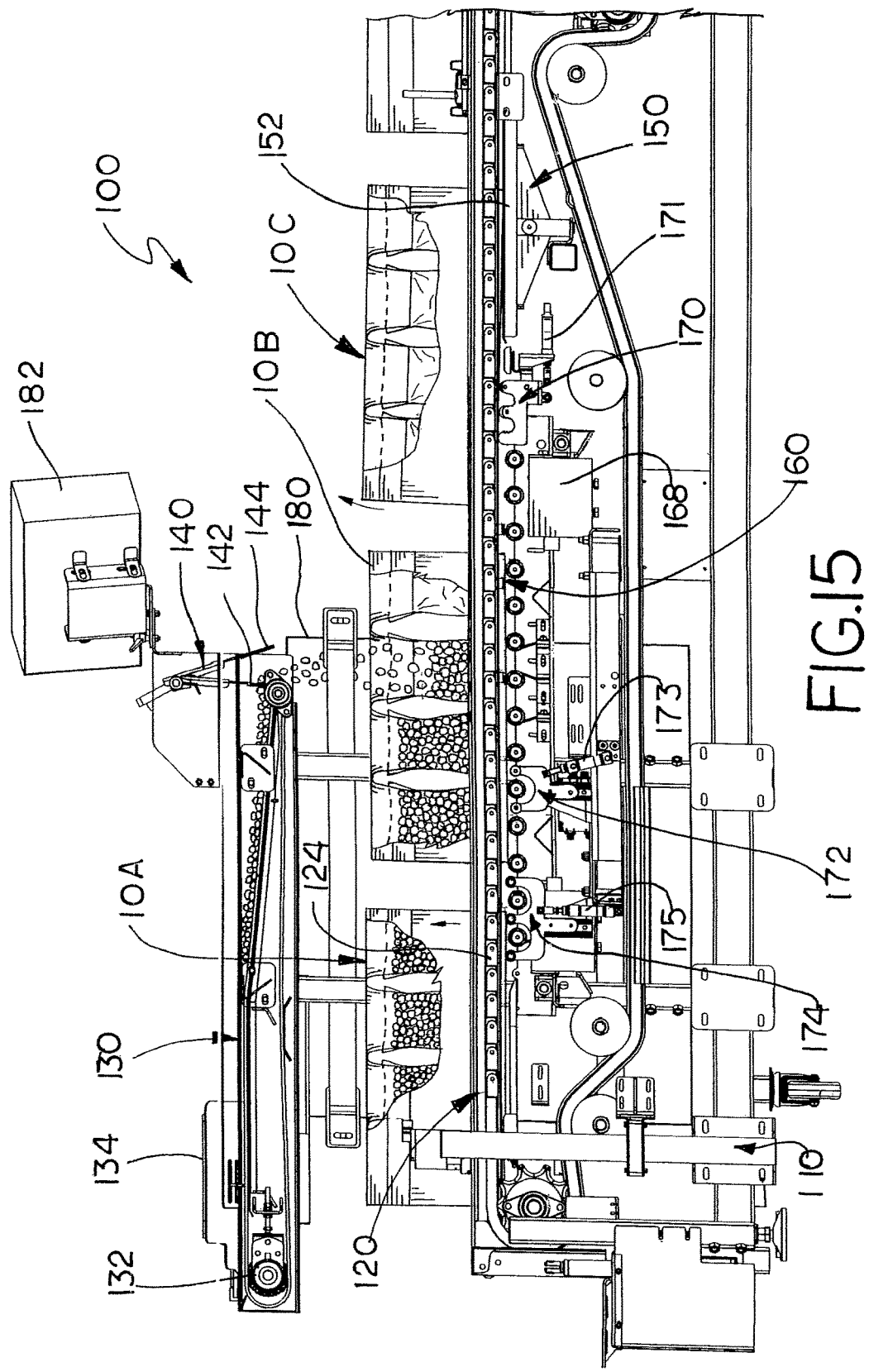
FIG. 15 is a partial side view of the box filler of FIG. 1 showing the third box lifters raising the initial packing box off of the roller deck, the "fine" weigh/fill of the third row of bags of the second packing box and the first box lifter raising the third successive packing box off the roller deck.
Figure 16:
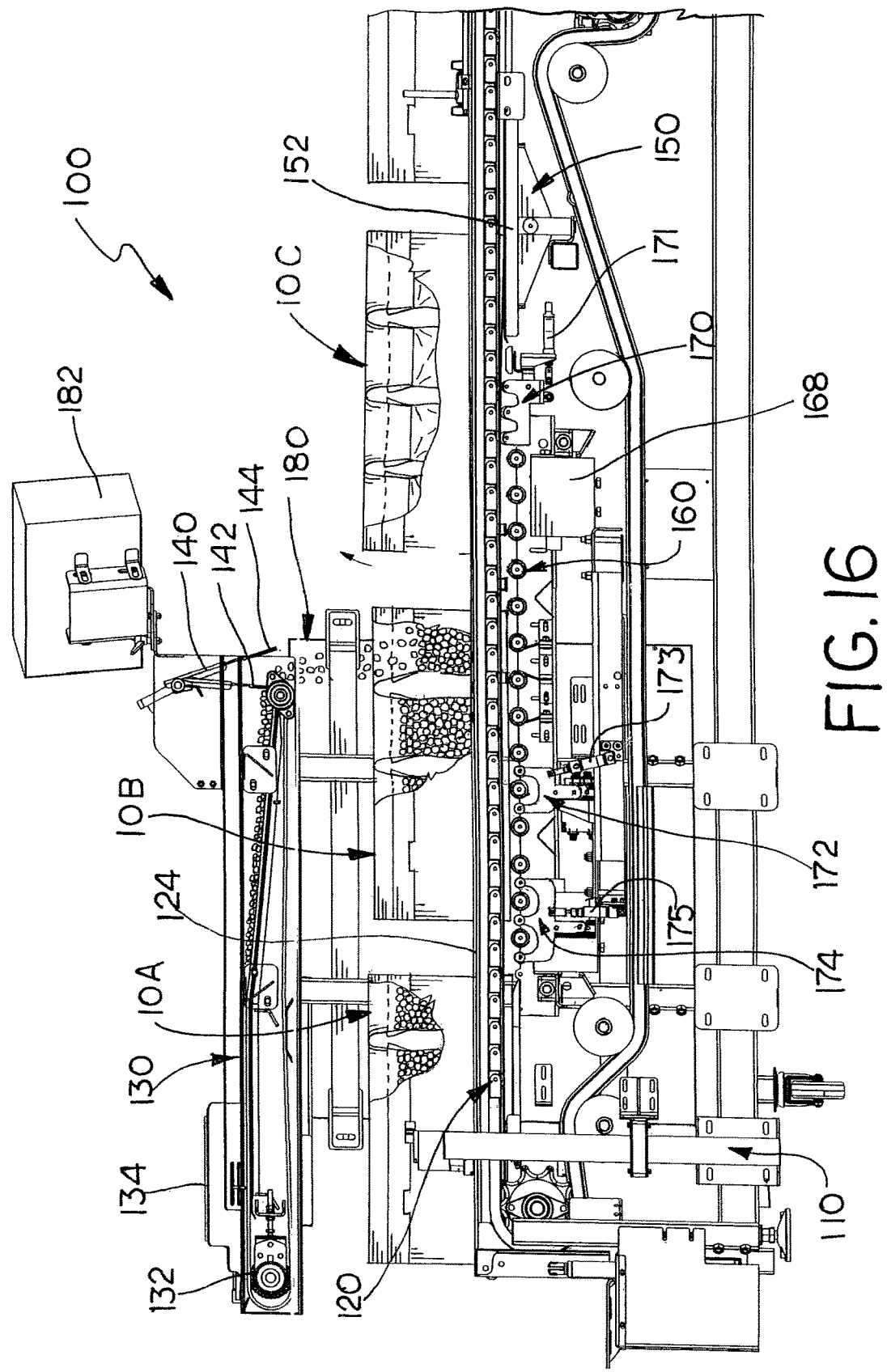
FIG. 16 is a partial side view of the box filler of FIG. 1 showing the "fine" weigh/fill of the fourth row of bags of the second packing box and the first box lifter raising the third successive packing box off the roller deck.

Once the fourth row of bags 20 of packing box 10A is weigh/filled, controller 180 triggers box conveyor 120 to advance packing box 10B into position to weigh/fill its first row of bags 20 and a third following packing box 10C into position over empty scale 150 where its empty "dry" weight is measured and stored by controller 180 (FIG. 13). Simultaneously, controller 180 deactivates box lifter 170 to lower packing box 10B onto roller deck 162 and activates both box lifters 172 and 174 to raise packing box 10A out of contact with roller deck 162. Once the first row of bags 20 of packing box 10B is weigh/filled, controller 180 triggers box conveyor 120 to advance moving packing box 10B into position to weigh/fill its second row of bags 20 (FIG. 14). Simultaneously, controller 180 activates box lift 170 to raise packing box 10C out of contact with roller deck 162. Controller 180 also deactivate box lift 172 so that packing box 10B remains in contact with roller deck 162 while box lifter 174 remains activated holding packing box 10A over roller deck 162 (FIG. 15). Once the third row of packing box 10B is weigh/filled, controller 180 triggers box conveyor 120 to advance packing box 10A completely off of roller deck 162 and deactivates box lifter 174 as packing box 10B moves along roller deck 162 (FIG. 16). Again, box lifter 170 continues to hold packing box 10C off of roller deck 162 as the fourth row of bags 20 of packing box 10B is weigh/filled. Controller continues to advance box conveyor 120 to incrementally move successive packing boxes 10 to weigh/fill each row of bags 20 as well as progressively activate and deactivate box lifters 170, 172 and 174 to ensure that only packing box 10 being weigh/filled is seated atop roller deck 162. Once it reaches the downstream end of box conveyor 120, the filled packing box 10 is conveyed or loaded onto another conveyor or apparatus for final package processing.

One skilled in the art will note several advantages provided by the box filler of the present invention. The independently actuated box lifters ensure an accurate weigh/fill and eliminates the need to space the packing boxes apart along the box conveyor, thereby improving the overall operation of the box filler. As one packing box is incrementally moved across the weigh/fill scale assembly and each row of bags is weigh/filled, the box lifters sequentially raise the adjacent preceding and following packing boxes out of contact with the weigh/fill scale assembly. In addition, the metering gate maximize the speed and accuracy of the weigh/fill process. The metering gate uses independently actuated gate paddles to selectively control the flow of cherries into the individual bags first at a high volume "gross" fill rate and then finishing with a more precise lower volume "fine" fill rate.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. An apparatus for metering produce into a plurality of individual containers aligned in multiple rows within a plurality of packing boxes comprising:
   a frame structure;
   a box conveyer supported by the frame structure for moving the plurality of packing boxes successively over the length of the apparatus;
   a produce conveyer supported suspended over the box conveyer for moving produce over the plurality of packing boxes;
   a metering gate supported by the frame structure adjacent to the produce conveyer for selectively metering produce from the produce conveyer into the individual containers of each successive row within each of the plurality of packing boxes;
   a weigh/fill assembly supported by the frame structure beneath the box conveyer, the weigh/fill assembly includes an elongated deck part over which the box conveyer moves the plurality of packing boxes and a weigh/fill scale operatively coupled to the deck part for measuring the weight of one of the plurality of packing boxes as produce is metered into the individual containers of each successive row within the one of the plurality of packing boxes while the one of the plurality of packing boxes is moved over the deck part by the box conveyer, the deck part has an upstream end and a downstream end;
   a plurality of box lifters supported by the frame structure and each independently moveable between a lowered position and a raised position for lifting the others of the plurality of packing boxes adjacent the one of the plurality of packing boxes out of contact with the deck part while produce is metered into the one of the plurality of packing boxes and the others of the plurality of packing boxes adjacent to the one of the plurality of packing boxes extend partially over the deck part, the plurality of box lifters include a first box lifter supported by the frame structure adjacent the upstream end of the deck part, a second box lifter supported by the structure adjacent the downstream end of the deck part, and a third box lifter supported by the frame structure beneath the deck part between the first box lifter and the second box lifter, the third box lifter extending upward through the deck part when the third box lifter is in the raised position; and
   a controller for actuating the box conveyer to incrementally move the plurality of packing boxes to successive positions across the length of the apparatus thereby positioning each row of the plurality of individual containers below the metering gate and for actuating the metering gate produce into the plurality of individual bags in response to the weigh/fill scale.

2. The apparatus of claim 1 wherein the deck part includes a plurality of spaced deck rollers, each of the first box lifter, the second box lifter and the third box lifter includes a plurality of spaced lift rollers that are interposed between the deck rollers when in their raised positions.

3. The apparatus of claim 1 and a sensor for detecting the relative positions of the one of the plurality of packing boxes, the controller triggering the box conveyer to incrementally advance in response to the sensor.

4. The apparatus of claim 1 wherein the metering gate includes a first gate part and a second part, each of the first gate part and the second gate part independently movable between an open position which allows produce to fall from the produce conveyer and a closed position which prevents produce from falling from the produce conveyer.

5. The apparatus of claim 4 wherein the metering gate includes an actuator operatively connected to the controller for moving each of the first gate part and the second gate part between the open position and the closed position.

6. The apparatus of claim 4 wherein the controller activates the first gate part and the second gate part to their open position in response to a first signal from the weigh/fill scale, the controller deactivates the first gate part to its closed position in response to a second signal from the weigh/fill scale when one row of the individual containers is filled to a first predetermined weight to provide a first flow, and the controller deactivates the second gate part to its closed position in response to a third signal from the weight/fill scale when the one row of the individual containers is filled to a second predetermined weight.

7. The apparatus of claim 1 wherein the produce conveyer is supported by the frame structure.

8. The Apparatus of claim 1 wherein the weigh/fill assembly also includes a second scale for measuring the gross weight of each of the plurality of packing boxes.

9. The apparatus of claim 1 wherein the first box lifter is positioned upstream of the weigh/fill assembly between the deck part and the second scale.

* * * * *